Patented Aug. 12, 1941

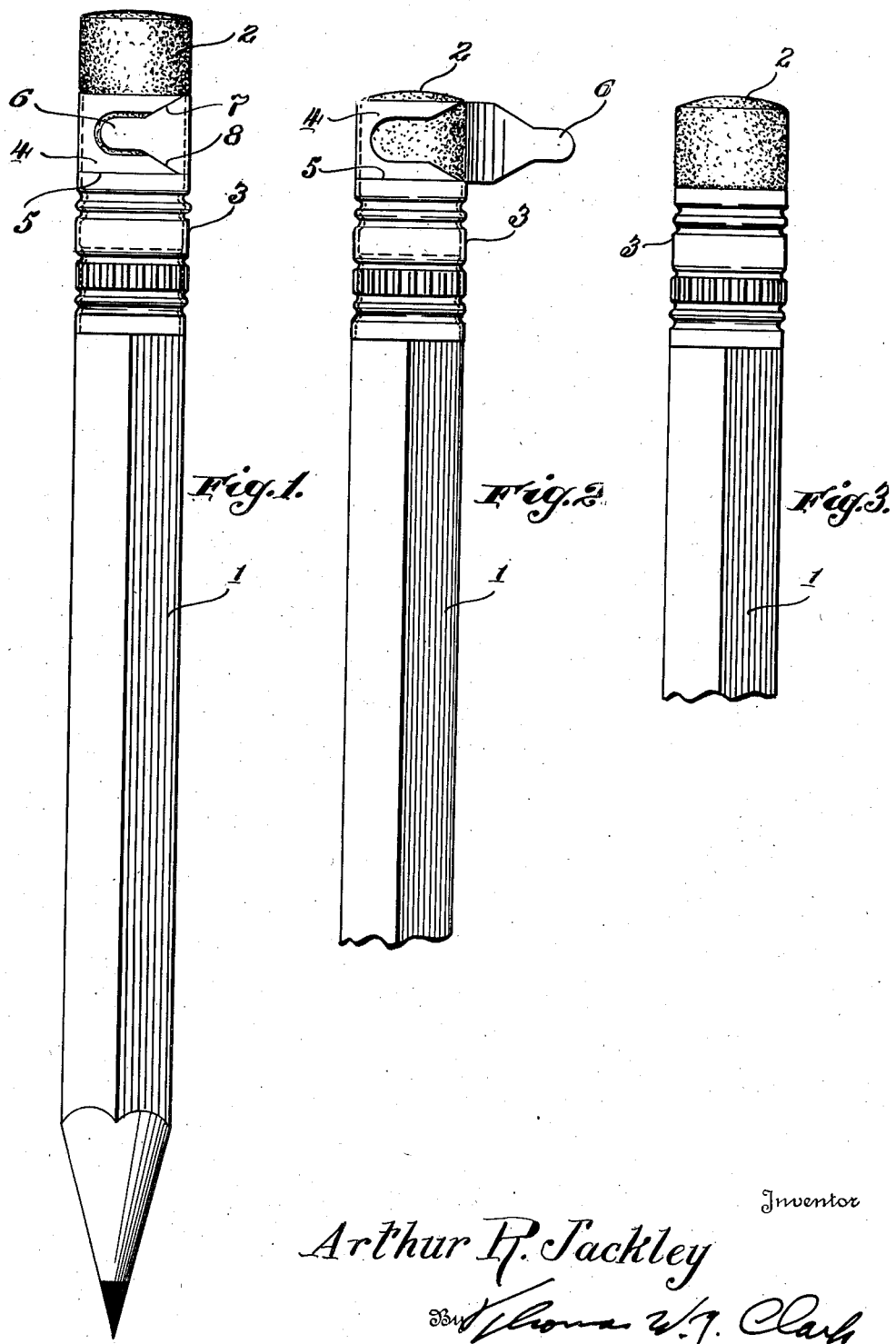

2,252,463

UNITED STATES PATENT OFFICE 2,252,463

PENCIL

Arthur R. Jackley, Baltimore, Md.

Application July 9, 1940, Serial No. 344,479

2 Claims. (Cl. 120—38)

This invention relates to a combination pencil, eraser and attaching means, and particularly to an attaching means which will hold firmly a long eraser and which, after consumption of a portion of the eraser another portion may be exposed to use. It is a primary object of the invention to provide ample erasing material for the life of the pencil, which may be kept firm for use at all times and the reserve supply of which may be exposed for use easily when the initial portion has been consumed. It is another object of the invention to provide such an eraser holder as will be very inexpensive in the manufacture, so that the complete pencil may be sold in competition with the pencils now on the market having only the usual single eraser portion.

These and other objects are attained by the structure shown in the accompanying drawing forming a part hereof and in which, Figure 1 is an enlarged view of the pencil, eraser and connecting means.

Figure 2 is a fragmentary portion of the same showing the eraser partly consumed and with the ferrule for holding the additional eraser section partly removed.

Figure 3 is a similar view with the ferrule section completely removed exposing for use the remainder of the eraser.

Similar numerals refer to similar parts in the views.

The pencil 1 has an unusually long eraser 2 connected to it, end to end, by a ferrule 3. This ferrule 3 is attached to the pencil in the usual manner. The ferrule has an upper section 4 formed integrally with it and the eraser 2 extends down into the ferrule 3 well past this section 4 so that it will be firmly held in the ferrule 3 after the removal of the section 4, as shown in Figure 3.

The section 4 is scored circumferentially as at 5, making a weakened line so that the section 4 may be torn from the ferrule 3. The section 4 has, preferably, centrally thereof a cutout pull-tab 6 and in its usual position this pull-tab fits snugly against the eraser. After the top portion of the eraser 2 has been consumed, as shown in Figure 2, the pencil user, by lifting the pull-tab 6 can tear off the section 4 of the ferrule 3 circumferentially of the eraser and expose an additional section of the eraser to use, as shown in Figure 3.

If desired the section 4 may have other scored lines, as at 7, leading to the top of ferrule 3 from the pull-tab, and as at 8, leading from the pull-tab to the score line 5. This additional scoring facilitates straight tearing of the section 4.

It will be apparent that the slight additional extension of the ferrule 3 and of the eraser 2 will add very little to the cost of the pencil. It will also be apparent that the eraser will be held firmly by the continuous circumferential top of the ferrule 3. Also the long eraser will be held firmly by the section 4 and this section, in addition, will keep the covered portion of the eraser soft and fresh for later use. The removal of the section 4 by pulling out the pull-tab and tearing the section from the ferrule 3 can be accomplished very readily.

It will be apparent that various modifications may be made in the structure of the ferrule without departing from the spirit of the invention.

What is claimed as new and is desired to be secured by Letters Patent is:

1. The combination with a pencil and eraser of a ferrule joining the two together end to end, the ferrule having a continuous circumferential portion at its extremity around the eraser and a scored circumferential line in the eraser holding portion, a pull-tab on the portion between said extremity and scored line, and a further scored line between said tab and ferrule extremity whereby tearing off the pull-tab portion at the scored lines exposes a further eraser portion for use.

2. The combination with a pencil and eraser of a ferrule joining the two together end to end, the ferrule having a continuous circumferential portion at its extremity around the eraser and a scored circumferential line in the eraser holding portion, a pull-tab cut from and lying flush with the portion between said extremity and scored line, whereby tearing off the pull-tab portion at the scored line exposes a further eraser portion for use.

ARTHUR R. JACKLEY.